Sept. 23, 1930.      W. F. ROCKWELL      1,776,703
DIFFERENTIAL AXLE
Filed Aug. 18, 1927      3 Sheets-Sheet 1

Inventor
Willard F. Rockwell
William A. Strauch
By
Attorney

Sept. 23, 1930.  W. F. ROCKWELL  1,776,703
DIFFERENTIAL AXLE
Filed Aug. 18, 1927   3 Sheets-Sheet 2
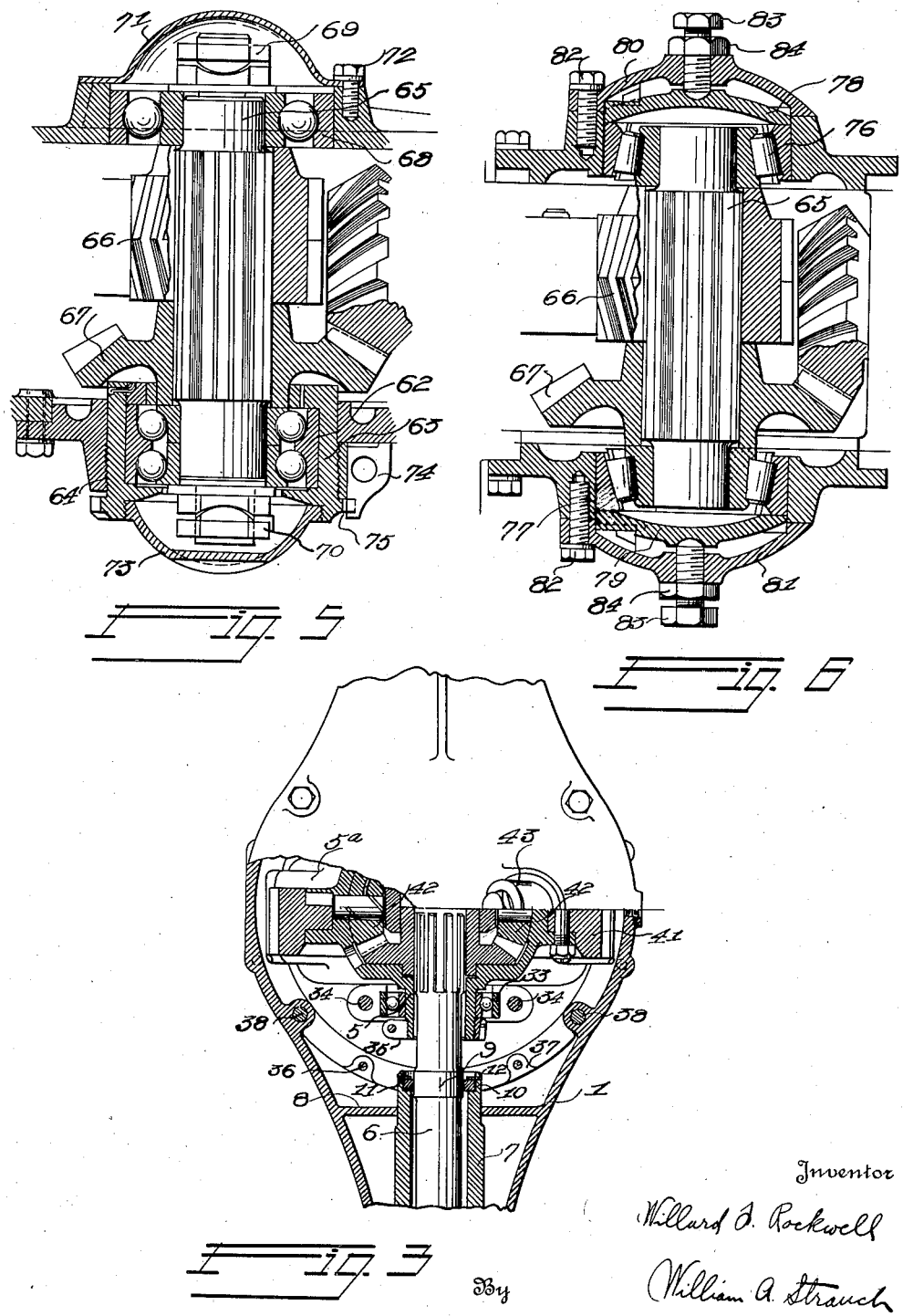

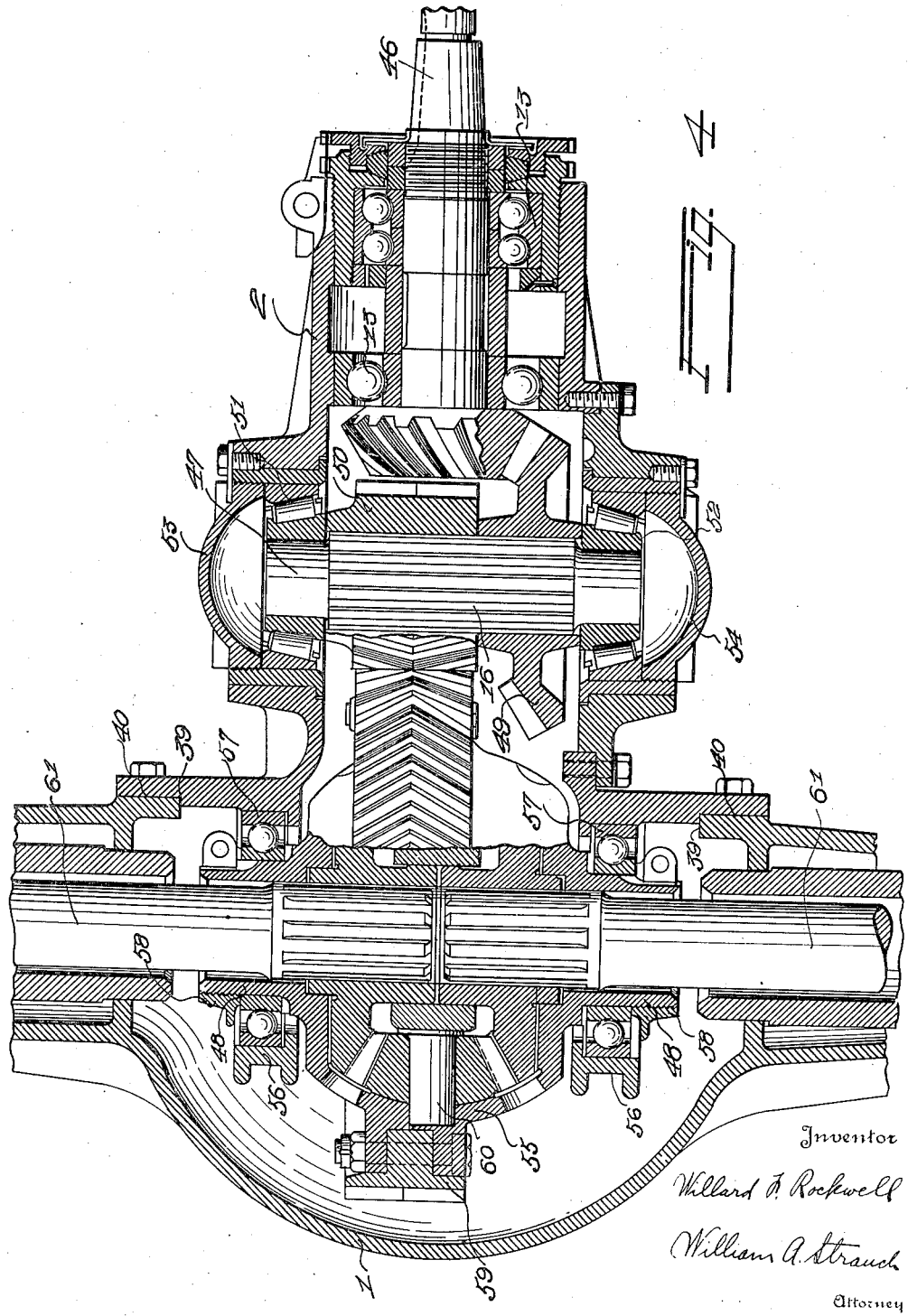

Patented Sept. 23, 1930

1,776,703

UNITED STATES PATENT OFFICE

WILLARD F. ROCKWELL, OF OSHKOSH, WISCONSIN, ASSIGNOR TO WISCONSIN PARTS COMPANY, OF OSHKOSH, WISCONSIN, A CORPORATION OF WISCONSIN

DIFFERENTIAL AXLE

Application filed August 18, 1927. Serial No. 213,957.

This invention relates to a double reduction axle construction designed especially for use in motor busses, trucks, or for similar comparatively heavy vehicles. This application is a continuation in part of application Serial No. 85,273, filed February 1, 1926.

In such vehicles, the center of gravity of the vehicle should be kept as low as possible to make it safe and practical to operate at high speed on winding roads. In order to secure a low center of gravity, the body of the vehicle must be brought as low as possible. To permit this the rear axle construction must be of minimum height.

In axle construction for heavy vehicles, it is also essential that the weight of the construction be kept as low as possible, consistent with strength, and that the elements thereof be so arranged that a maximum compactness is obtained, otherwise the housing surrounding said elements must be made so large that the weight of the assembly is excessive. At the same time, the desired compactness must be secured without sacrificing the advantages in reduced cost accruing from simplicity of structure and interchangeability of parts.

The primary object of this invention is to produce an axle construction embodying gearing necessary to effect a double reduction of the speed of the propeller shaft, that permits the use of a low body floor level, in which the gears are compactly arranged, which may be used with axle sections that may be interchanged and which can at the same time be produced at comparatively low expense and without excessive dead weight.

A further object of the invention is to provide a double reduction axle construction in which the ring gear of the differential housing is offset with respect to the vertical central plane that ordinarily contains the axis of the propeller shaft to the end that the necessary reduction may be secured without increasing unnecessarily the size of the axle housing.

A further object of the invention is to provide a double reduction axle in which interchangeable axle sections may be used in a construction in which the differential driving gear is not arranged centrally of the vehicle.

A still further object of the invention is to provide a double reduction axle in which the intermediate shaft can be readily adjusted or removed without disassembling the axle mechanism.

A still further object of the invention is to provide a double reduction axle construction in which the shafts and gearing all rotate about axes arranged approximately in the same horizontal plane whereby the shafts and gearing may be efficiently lubricated from a common lubricant reservoir.

A still further object is to employ herringbone gears in the gear train between the drive shaft and the differential, such gears being inherently capable of conveying the lubricant in quantities to adjacent parts above the oil level.

Further objects of the invention will appear as the description of the invention proceeds with reference to the accompanying drawings in which—

Figure 3 is a side elevation, partly in section, of the construction shown in Figure 2.

Figure 4 is a horizontal section of a modified form, looking up from the bottom.

Figure 5 is a horizontal section of a portion of the housing showing a modified construction for adjusting the intermediate shaft.

Figure 6 is a horizontal section showing a further modification of the construction appearing in Figure 4.

Like reference characters indicate like parts throughout the several views.

Figure 2:
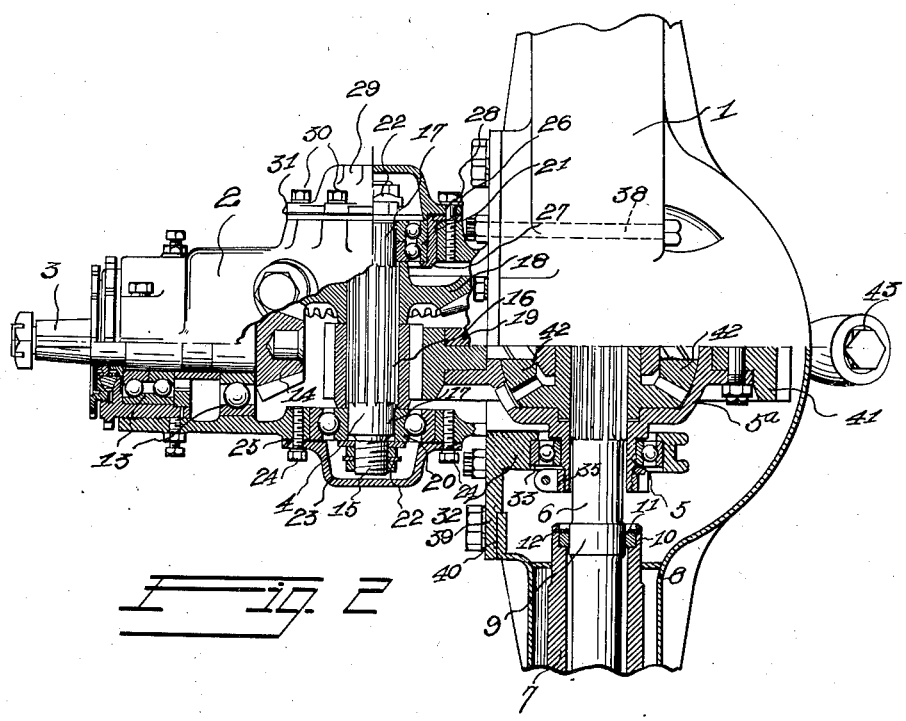
Figure 2 is a plan view partly in section of the improved construction, portions of the housing being broken away.
Figure 1:
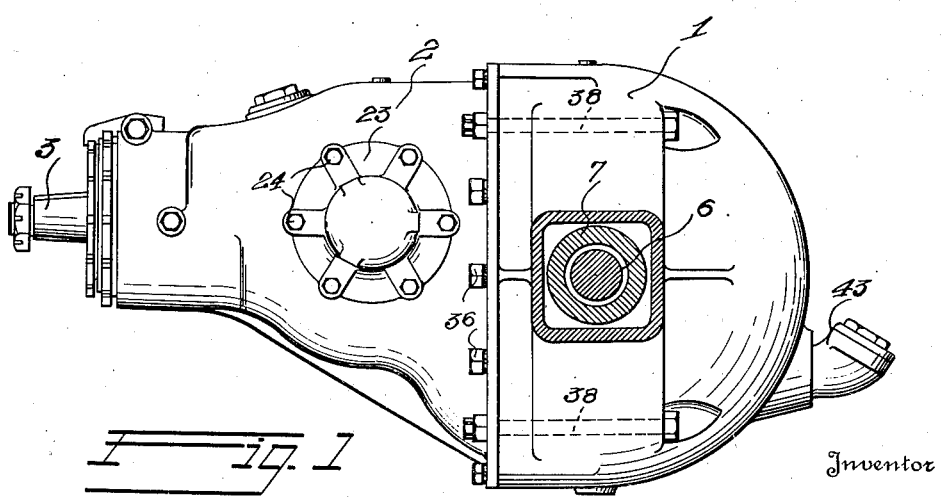
Figure 1 is a vertical sectional view taken through one of the interchangeable axle sections intermediate the ends thereof.

Referring to Figures 1, 2 and 3 numeral 1 indicates the axle or load supporting housing, 2 the gear supporting housing, 3 the primary driving shaft or propeller shaft section, 4 the intermediate shaft, and 5 the hollow differential supporting spindles or extensions. Spindles 5 support the differential housing 5$^a$ as will more fully hereinafter appear.

Slidably and rotatably supported in the extensions 5 are the ends of live axle sections or wheel driving shafts 6. Axle sections 6 are arranged in dead axle sections 7, the reduced inner ends of which are supported on inwardly projecting flanges 8 carried by housing 1. An enlarged cylindrical section 9 (Figures 2 and 3) formed on each live axle section 6 is provided adjacent the end of each dead axle section 7. Seated in a recess in the end of each section 7 and surrounding section 9 of axle 6, is a gasket 10, preferably made of felt. A split ring 11 made of resilient material so that it may be snapped in a circumferential groove 12 in section 7 serves to hold gasket 10 in place preventing the escape of lubricant from housing 1 between the dead and live axle sections.

Shaft 3 is suitably journaled in housing 1 on bearings 13, adjustably supported in said housing in any approved manner. A bevel gear 14 is arranged adjacent the end of shaft 3 and the inner bearings 13 abut against said gear, the arrangement being such that the bearings, gear, and shaft may be adjusted bodily, as may be needed.

In the form of the invention shown in Figures 1, 2, and 3, the intermediate shaft 4 has reduced threaded ends 15 and a longitudinally splined central section 16, smooth cylindrical surfaces 17 between threaded ends 15 and splined section 16. Slidably splined on section 16 is a bevel gear 18 meshing with gear 14 in shaft 3, and a spur pinion 19. As clearly shown in Figure 2, gear 18 and pinion 19 are mounted on shaft 4 and abut against each other for adjustment as a unit.

A suitable ball bearing 20, and radial thrust ball bearing 21 are arranged on shaft 4 on sections 17 adjacent threaded ends 15. Suitable nuts 22 threaded on ends 15 serve to clamp bearing 20, pinion 19, gear 18, and bearing 21 on shaft 4. By the arrangement just described, proper adjustment may be made between the parts carried by shaft 4 and the end thrust on shaft 4 is resisted by bearing 21.

The assembly just described is supported in suitable bores formed in housing 2 with the outer race of bearing 20 abutting against cap 23 secured to housing 2 by bolts 24. Shims 25 may be inserted between cap 23 and housing 2 to adjust the assembly with relation to the housing. A sleeve or bearing cage 26 (Figure 2) having a shoulder 27 engaging the outer race of bearing 21 is supported in an opening in housing 2. An annular flange 28 on cap 29 engages the outer face of the outer race of bearing 20. Bolts 30 serve to secure cap 29 to housing 1, shims 31 being inserted between said cap and housing when necessary to effect proper adjustment of the assembly as a unit.

Formed integrally with housing 2 are bearing supporting sections 32, preferably split, as by a vertical plane parallel to the axle sections, on a diameter so that the bearings 33, supporting extensions 5 of differential housing 5$^a$, may be clamped within and supported by the sections thus formed by bolts 34 (Figure 3). An adjustment thus is provided, since the nuts on bolts 34 may be tightened occasionally to draw the parts of sections 32 together for the purpose of taking up any play caused by wear and for ensuring a firm and vibrationless mounting for the shaft-like extensions of the differential housing. A split sleeve 35 threaded on the end of each extension 5 adjustably holds each bearing 33 from endwise movement in one direction while a shoulder on each section 32 prevents movement of bearings 33 in the opposite direction. It will thus be seen that the differential housing 5$^a$ is supported from housing 2. Bolts 36 passing through lugs 37 of housing 1 (Figures 2 and 3) and through bolts 38 passing through to the rear of housing 1 serve to firmly secure the housing 2 and the parts carried thereby in proper position with respect to the live and dead axle sections carried by housing 1. Housing 2 is provided with a suitable locating tongue 39 and a locating surface 40, the plane of which is normal to the axis of propeller 3, and which abuts against a suitable locating surface on housing 1 whereby the gear and load carrying housings together with the parts carried thereby are located with respect to each other with maximum accuracy and a minimum machining cost. Differential housing 5$^a$ which carries internally thereof the usual form of bevel differential gears is formed in two sections, one of which is wider than the other so that ring gear 41 arranged between the flanges of said sections is substantially offset with respect to the axis of the propeller shaft 3. The differential bevel pinions 42 carried within housing 5$^a$ are arranged to turn bodily with the housing and to rotate about axes that are located in the vertical plane that contains the axis of propeller shaft 3 and differentially drive the bevel gears 42 in which the inner ends of axle shafts 6 are slidably splined. By this arrangement, interchangeable axle shafts 6 may be used, that is, it is not necessary to provide right and left axle sections. The offsetting of the ring gear 41 does not interfere with the use of interchangeable axle sections, but at the same time permits the use of a small bevel pinion 14 so that a comparatively large amount of speed reduction may be secured without necessitating the use of a large, and consequently heavy, gear housing 2.

As clearly shown in Figure 1 of the drawings the axis of the intermediate shaft 4 is spaced but slightly above the axis of the axle sections 6 and the gear housing 2 is accordingly brought entirely between the planes parallel to the axis of shaft section 3 that are tangent to the housing 1. The center of gravity of the construction is thus brought as low as practicable and the floor of the vehicle can be brought down substantially to the upper surface of housing 1. At the same time the gearing can be adequately lubricated since none of said gearing is arranged substantially above or below a horizontal plane that contains the axis of the drive shaft, and the intermediate shaft and in operation ring gear 41 carries lubrication upward from housing 1 into which it is charged through the lubrication inlet 43.

In Figure 4 is shown a modification of the invention including the axle or load supporting housing 1, and gear housing 2 provided with the locating surfaces 39 and 40 to properly locate gear housing 2 with respect to the load supporting housing. Housing 2 supports and locates all of the shafts, the axes of which in this form of the invention are all located in substantially the same horizontal plane. Said shafts are the drive or propeller shaft section 46, the intermediate shaft 47, and hollow differential housing shaft sections 48. Intermediate shaft 47 has a bevel gear 49 and a herringbone pinion 50 slidably arranged on a splined section thereof, and bearings 51 and 52 on reduced cylindrical extensions. Bearing 51, gears 50 and 49 and bearing 52 abut against each other on said shaft and are adjustably held from endwise movement by abutments 53 and 54 in the form of caps threaded in openings in gear housing 2, said caps engaging the outer bearing rings as clearly shown in Figure 4.

The cylindrical extensions of differential housing 55 constituting tubular shafts 48 are supported in yokes 56 extending from gear housing 2, bearings 57 being arranged between said extensions and said yokes and held on said extensions by threaded split sleeves 58. Housing 55 is made in two sections that are not of equal width so that herringbone ring gear 59 secured between the flanges of said sections is offset with respect to the vertical plane that contains the axis of the drive shaft for the purpose above described with reference to Figures 1, 2 and 3. The teeth of the herringbone gear 59 form pockets at the angle formed between the inclined faces of each tooth and as said gear rotates through the lubricant ordinarily carried in housing 1, a quantity thereof is carried upwardly and discharged into gear housing 2, lubricating the reduction gearing and thus insuring satisfactory circulation of the lubricant through the entire reduction and differential gearing.

Arranged within housing 55 are the differential bevel gears of usual form. The pins 60 about which the differential bevel pinions rotate are arranged with their axes of rotation in the vertical plane that contains the axis of the drive shaft 46. By this arrangement interchangeable axle sections 61 can be used.

In Figure 5 a modification of the arrangement for adjustably supporting the intermediate shaft is shown. In this form of the invention the intermediate shaft is of the form of that shown in Figures 1 to 3 in which the bearings and gears are slid on the shaft and clamped together by nuts engaging threaded extensions on the ends of the intermediate shaft, to form a unitary structure that can be adjusted as a unit. In Figure 5 the thrust ball bearing 62 is arranged in a cage 63 that is adjustably threaded in an opening 64 in the gear housing. Adjustment of cage 63 serves to adjust the assembly consisting of shaft 65, gears 66 and 67, bearings 68 and 62 all of which are clamped against each other on said shaft between nuts 69 and 70 threaded on the reduced ends of shafts 65. A cap 71 secured to the gear casing by screws 72 serves as a stop for the assembly carried by shaft 65. A cap 73 threaded in a recess in cage 63 serves to cover nuts 70. A locking dog 74 engaging any one of a series of notches 75 in the edge of box 63 serves to hold it locked in its adjusted position.

In the form of the invention shown in Figure 6, roller bearings 76 and 77 are used instead of the ball bearings used in the form shown in Figure 5. Bearings 76 and 77 and gears 66 and 67 of this form of the invention are slid on intermediate shaft 65 and clamped between adjustable abutments in the form of dished plates 78 and 79. Plates 78 and 79 fit slidably in openings in the gear housing and engage the outer races of bearings 76 and 77. Caps 80 and 81 secured to the gear housing by screws 82 cover said openings. To adjust the abutments or plates 78 and 79 screws 83 are threaded centrally through said caps and engage said plates. Lock nuts 84 serve to hold the screws 83 in their adjusted position. By this arrangement adjustment may be made of the shaft 65 and the parts carried thereby by manipulating screws 83, after releasing lock nuts 84, it being possible to do so without removing any part of the axle assembly.

In operation of the form of invention shown in Figures 1 to 3, power is transmitted to the drive shaft 3 by connecting said shaft with the drive shaft of the engine of a vehicle such as a bus. The speed of rotation of said shaft is reduced by small gear 14 and large gear 18 and is again reduced by small gear 19 on intermediate shaft 16 and ring gear 41 on the differential housing 5ª. The power is thus transmitted to the differential housing which in turn transmits it differentially to the interchangeable axle sections 6. Housing 1 is provided with lubricant and the gears operate therein carrying it to the gears on the intermediate shaft from a single reservoir. This is possible because the gears all turn about axes located in the same or substantially the same horizontal plane. Escape of lubricant from the housing 1 between live axle 6 and dead axle 7 is prevented by the gaskets 10. It will be observed that a construction is thus provided that is of minimum weight, that is of extreme compactness and simplicity, that embodies an intermediate shaft that can be readily removed or adjusted, and that at the same time results in a construction that has the desired low-center of gravity and restricted overall vertical dimensions.

The invention may be embodied in other specific forms without departing from the spirit or essential characteristics thereof, and the present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as my invention is:

1. A gear assembly for a double reduction axle comprising a housing provided with means to secure it to an axle with its axis at right angles to the axis of said last named housing, a driving shaft, an intermediate shaft, and a differential shaft journalled in said first named housing with their axes in approximately the same horizontal plane, means operatively connecting the driving and differential shafts through said intermediate shaft so arranged that interchangeable axle sections may be associated with the differential assembly carried on the differential shaft said means and said intermediate shaft being held in said housing by removable abutments arranged to permit endwise removal of said shaft in either direction upon removal of said abutments.

2. An axle construction including a housing, a driving shaft, an intermediate shaft, a differential shaft, bearings for said shafts in said housing, gearing operatively connecting said shafts, the gearing and the bearings on the intermediate shaft being slidable endwise of said shaft to a limited degree in both directions, and secured in position thereon by removable and adjustable means providing abutments engaging the bearings on said shafts and adjustably secured to said housing, whereby the intermediate shaft may be removed and the bearings and gearing adjusted upon removal or adjustment of said means.

3. In a double reduction axle construction, a gear housing, an intermediate shaft journalled therein, gears and bearings slidable on said shaft to a limited degree in both directions, said gears and bearings being held together between caps removably and adjustably secured to said housing, said caps being of a size sufficient to permit removal of the shaft upon removal of a cap.

4. A double reduction axle construction comprising a housing, a differential supported in said housing, a drive shaft and an intermediate shaft journaled in said housing, gears operatively connecting said drive shaft and said differential through said intermediate shaft, the gears on the intermediate shaft being slidably mounted for movement endwise of the shaft to a limited degree in both directions, bearings on said shaft, and caps adjustably engaging said housing between which the bearings and gear are confined, said caps being of a size sufficient to permit removal of the intermediate shaft upon removal of a cap.

5. In a double reduction axle construction, an intermediate shaft, a housing supporting said shaft, gears mounted on said shaft so that relative movement of the shaft in an endwise direction is permitted, bearings between said housing and shaft, and abutments adjustably secured to said housing and holding said bearings and gears from movement endwise of the shaft.

6. In a double reduction axle construction, an intermediate shaft, a housing supporting said shaft, gears slidably mounted on said shaft, bearings between said shaft and housing, means constituting abutments adjustably and removably secured to said housing and serving to hold the gears and bearings in assembled relation, part of said housing adjacent said gears being removable, whereby the shaft or the gears may be readily removed upon the removal of said means or the removable portion of said housing.

7. An axle construction including a housing, a drive shaft, an intermediate shaft, and a differential shaft journaled in said housing, a differential on said last named shaft, interchangeable axle sections associated with said differential, a plurality of gears slidably mounted on said intermediate shaft designed to transmit the rotation of the drive shaft to said differential, bearings slidably mounted on said intermediate shaft, said bearings and gears being clamped together on said shaft for adjustment as a unit along said shaft, and abutments adjustably secured at opposite ends of said last named shaft to said housing to adjust said gears and bearings as a unit on said shaft.

8. A double reduction axle comprising an axle housing, a gear housing, a drive shaft, an intermediate shaft, a differential, and gearing between said drive shaft and differential to transmit the power of the drive shaft through said intermediate shaft to said differential, said shafts and gearing being mounted in said gear housing with the axes of rotation of said shafts and gearing approximately in the same horizontal plane, means including a plurality of through bolts to secure said gear housing to said axle housing so that the axis of differential is in alignment with the transverse axis of said axle housing and interchangeable axle sections mounted in the axle housing and operatively connected to said differential.

9. In the construction defined in claim 8, said differential having a pair of extensions mounted in a corresponding pair of bearings, and a pair of vertical yokes carried by the gear housing and projecting into the axle housing to receive said bearings from their outer sides and provide supports therefor, each of said yokes being vertically split into two parts and provided with means for adjustably securing said two parts together.

In testimony whereof I affix my signature.

WILLARD F. ROCKWELL.